(12) United States Patent
Suzuki et al.

(10) Patent No.: US 7,371,453 B2
(45) Date of Patent: May 13, 2008

(54) DECORATIVE SHEET, MOLDED ARTICLE, AND MOTOR VEHICLE PROVIDED WITH THE SAME

(75) Inventors: Yasuo Suzuki, Iwata (JP); Naohiro Morozumi, Iwata (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 49 days.

(21) Appl. No.: 10/509,369

(22) PCT Filed: Dec. 25, 2003

(86) PCT No.: PCT/JP03/16838

§ 371 (c)(1),
(2), (4) Date: Sep. 28, 2004

(87) PCT Pub. No.: WO2004/062905

PCT Pub. Date: Jul. 29, 2004

(65) Prior Publication Data

US 2005/0221063 A1    Oct. 6, 2005

(30) Foreign Application Priority Data

Jan. 8, 2003   (JP)   .............. 2003-002292

(51) Int. Cl.
*B41M 5/00*   (2006.01)
(52) U.S. Cl. .................. 428/195.1; 428/204; 428/209; 428/31
(58) Field of Classification Search .................. 428/31, 428/195.1, 204, 209
See application file for complete search history.

(56) References Cited

U.S. PATENT DOCUMENTS

| | | | | |
|---|---|---|---|---|
| 4,012,552 A | * | 3/1977 | Watts | 428/200 |
| 4,296,155 A | * | 10/1981 | Madonia et al. | 428/31 |
| 4,404,237 A | * | 9/1983 | Eichelberger et al. | 427/97.5 |
| 4,475,975 A | * | 10/1984 | Talley et al. | 156/234 |
| 4,520,053 A | * | 5/1985 | Marentic | 428/31 |
| 4,552,715 A | * | 11/1985 | Ando et al. | 264/309 |
| 4,603,065 A | * | 7/1986 | Mori et al. | 428/31 |

(Continued)

FOREIGN PATENT DOCUMENTS

JP   62-142633   6/1987

(Continued)

OTHER PUBLICATIONS

Official communication issued in the counterpart Japanese Application No. 2004-566300, mailed on Apr. 10, 2007.

(Continued)

*Primary Examiner*—Bruce Hess
*Assistant Examiner*—Tamra L. Dicus
(74) *Attorney, Agent, or Firm*—Keating & Bennett, LLP

(57) ABSTRACT

A decorative sheet includes a base member, made of a resin material and having a first and a second principal surfaces opposite to each other, a decoration layer provided on the first principal surface of the base member and having a pattern area representing a predetermined pattern, and a spread suppressing member provided in a position corresponding to the pattern area on the side of the first principal surface or on the side of the second principal surface of the base member, for suppressing the spread of the pattern area of the decoration layer.

22 Claims, 15 Drawing Sheets

U.S. PATENT DOCUMENTS

| | | | | |
|---|---|---|---|---|
| 4,877,657 | A | * | 10/1989 | Yaver .......................... 428/31 |
| 5,055,346 | A | * | 10/1991 | Rohrbacher ................ 428/216 |
| 5,102,497 | A | * | 4/1992 | Hamaguchi et al. .......... 216/54 |
| 5,106,126 | A | * | 4/1992 | Longobardi et al. .......... 283/94 |
| 5,178,928 | A | * | 1/1993 | Goto et al. ................ 428/106 |
| 5,532,045 | A | * | 7/1996 | Wade ........................ 428/187 |
| 5,928,767 | A | * | 7/1999 | Gebhardt et al. ........... 428/209 |
| 5,931,522 | A | * | 8/1999 | Roskey ................. 296/136.07 |
| 6,001,292 | A | * | 12/1999 | Atake ........................ 264/135 |
| 6,180,207 | B1 | * | 1/2001 | Preisler et al. .............. 428/139 |
| 6,426,143 | B1 | * | 7/2002 | Voss et al. .................. 428/378 |
| 6,491,782 | B1 | * | 12/2002 | Jaynes ........................ 156/277 |
| 6,548,128 | B2 | * | 4/2003 | Auld et al. .................... 428/13 |
| 6,575,371 | B1 | * | 6/2003 | Hoppe et al. ............... 235/488 |
| 6,677,065 | B2 | * | 1/2004 | Blauer .......................... 40/1.5 |
| 6,733,870 | B2 | * | 5/2004 | Enlow et al. ............... 428/207 |
| 6,748,641 | B2 | * | 6/2004 | Watanabe et al. ............. 29/458 |
| 6,892,607 | B2 | * | 5/2005 | Hayashi et al. ............... 74/558 |
| 2002/0003696 | A1 | * | 1/2002 | Kalana ........................ 362/29 |
| 2002/0048667 | A1 | * | 4/2002 | Kauppi et al. ............. 428/209 |

FOREIGN PATENT DOCUMENTS

| | | |
|---|---|---|
| JP | 04-212851 | 8/1992 |
| JP | 05-057786 A | 3/1993 |
| JP | 07-156196 | 6/1995 |
| JP | 07-290501 | 11/1995 |
| JP | 08-011499 | 1/1996 |
| JP | 09-109350 | 4/1997 |
| JP | 10-249999 | 9/1998 |
| JP | 10-297122 | 11/1998 |
| JP | 11-070622 | 3/1999 |
| JP | 2001-219524 A | 8/2001 |
| JP | 2002-103433 A | 4/2002 |
| JP | 2002-275405 | 9/2002 |

OTHER PUBLICATIONS

Yasuo Suzuki et al.; "Decorative Sheet, Decorated Molded Article, and Motor Vehicle"; U.S. Appl. No. 11/718,646, filed May 4, 2007.

Yasuo Suzuki et al.; "Decorative Sheet, Molded Article, Motor Vehicle, and Production Method of Molded Article"; U.S. Appl. No. 10/972,168, filed Oct. 22, 2004.

Yasuo Suzuki et al.; "Process for Production of Moldings and Motor Vehicles"; U.S. Appl. No. 11/718,651, filed May 4, 2007.

Naohiro Morozumi et al.; "Decorative Sheet, Formed Product and Transportation Apparatus"; U.S. Appl. No. 11/749,953, filed May 17, 2007.

Naohiro Morozumi et al.; "Decorative Sheet, Formed Product and Transportation Apparatus"; U.S. Appl. No. 11/749,958, filed May 17, 2007.

Official communication issued in the counterpart Japanese Application No. 2004-566300, mailed on Aug. 14, 2007.

* cited by examiner (a)

(b)

(a)

(b)

(c)

DECORATIVE SHEET, MOLDED ARTICLE, AND MOTOR VEHICLE PROVIDED WITH THE SAME

BACKGROUND OF THE INVENTION

1. Field of the Invention

The present invention relates to a molded article, which is decorated, and a production method thereof. The present invention also relates to a decorative sheet used for decorating a molded article, and a motor vehicle provided with such a molded article.

2. Description of the Related Art

Recently, as a technique for decorating various kinds of molded articles, a technique for attaching a decorative sheet onto a surface of a molded article has been proposed. The decorative sheet used in this technique is disclosed in Japanese Laid-Open Patent Publication No. 10-249999, for example.

The decorative sheet disclosed in the above-identified publication includes a base member and an ink layer provided on a surface of the base member by printing. The decorative sheet is attached to a molded article with an adhesive. When such a decorative sheet is used, the molded article can be easily recycled as compared with the case of paint application using a coating material. In addition, such a decorative sheet creates a beautiful appearance which is different from paint application, such that the decorative quality is improved.

A conventional decorative sheet is, however, suitable for the decoration of a molded article having a flat surface, but is not suitable for the decoration of a molded article having an uneven surface. When such a decorative sheet is attached to a molded article having an uneven surface, the decorative sheet is spread so as to follow the unevenness. Therefore, if a pattern of a character, a graphic symbol, a picture, or other decoration is represented in a portion of the decorative sheet, the pattern is deformed, and the decorative appearance is deteriorated.

SUMMARY OF THE INVENTION

To overcome the problems described above, preferred embodiments of the present invention provide a decorative sheet preferably used for the decoration of a molded article having an uneven surface, a molded article to which the decorative sheet is attached, a production method thereof, and a motor vehicle provided with such a molded article.

A decorative sheet according to a preferred embodiment of the present invention includes a base member made of a resin material and having first and second principal surfaces that are opposed to each other, a decoration layer provided on the first principal surface of the base member and having a pattern area representing a predetermined pattern, and a spread suppressing member provided at a location corresponding to the pattern area on the side of the first principal surface or on the side of the second principal surface of the base member, for suppressing the spreading of the pattern area of the decoration layer.

In one preferred embodiment, the resin material is a thermoplastic resin material.

In another preferred embodiment, the spread suppressing member has a higher coefficient of thermal conductivity than a coefficient of thermal conductivity of the base member.

In another preferred embodiment, the spread suppressing member is made of a material including metal or a metal compound.

In another preferred embodiment, the spread suppressing member is made of metal.

In one preferred embodiment, a coefficient of thermal conductivity of the spread suppressing member is about 10 W/m·K or more.

Preferably, a thickness of the spread suppressing member is in the range of about 5 μm to about 100 μm.

Preferably, the spread suppressing member includes a first portion which overlaps the pattern area.

More preferably, the spread suppressing member includes a second portion disposed in an outer circumference of the first portion.

Preferably, a width of the second portion of the spread suppressing member is in the range of about 1 mm to about 10 mm.

More preferably, a width of the second portion of the spread suppressing member is in the range of about 2 mm to about 8 mm.

The molded article according to another preferred embodiment of the present invention includes a molded article body and the decorative sheet having the above-described structure, which is joined to a surface of the molded article body.

In another preferred embodiment of the present invention, the molded article includes a molded article body, and a sheet joined to a surface of the molded article body, wherein the sheet includes a base member and a decoration layer provided on a surface of the base member on the side of the molded article body, the decoration layer has a pattern area representing a predetermined pattern, and a portion of the sheet corresponding to the pattern area has a thickness that is in the range of about 1.1 times to about 1.8 times a thickness of the other portion of the sheet.

Preferably, the portion of the sheet corresponding to the pattern area has a thickness that is in the range of about 1.2 times to about 1.6 times the thickness of the other portion of the sheet.

A motor vehicle according to another preferred embodiment of the present invention includes the molded article having the above-described structure.

A production method of a molded article according to another preferred embodiment of the present invention includes the steps of preparing a decorative sheet including a base member made of a resin material and having first and second principal surfaces that are opposed to each other, a decoration layer provided on the first principal surface of the base member and having a pattern area representing a predetermined pattern, and a spread suppressing member provided at a location corresponding to the pattern area on the side of the first principal surface or on the side of the second principal surface of the base member for suppressing the spreading of the pattern area of the decoration layer, preparing a molded article body, and joining the decorative sheet to a surface of the molded article body.

In another preferred embodiment of the present invention, the production method of a molded article includes, before the step of joining the decorative sheet to the surface of the molded article body, the step of heating the decorative sheet.

In another preferred embodiment, the resin material is a thermoplastic resin material.

In another preferred embodiment, the spread suppressing member has a higher coefficient of thermal conductivity than a coefficient of thermal conductivity of the base member.

In another preferred embodiment, the spread suppressing member is made of a material including metal or a metal compound.

In another preferred embodiment, the spread suppressing member is made of metal.

In another preferred embodiment, the coefficient of thermal conductivity of the spread suppressing member is about 10 W/m·K or more.

Preferably, a thickness of the spread suppressing member is in the range of about 5 μm to about 100 μm.

Preferably, the spread suppressing member has a first portion which overlaps the pattern area.

More preferably, the spread suppressing member includes a second portion disposed in an outer circumference of the first portion.

Preferably, a width of the second portion of the spread suppressing member is in the range of about 1 mm to about 10 mm.

More preferably, a width of the second portion of the spread suppressing member is in the range of about 2 mm to about 8 mm.

In another preferred embodiment, the step of joining the decorative sheet to the surface of the molded article body includes the step of moving the heated decorative sheet closer to the molded article body, and the step of reducing a pressure of a first space formed between the decorative sheet that is closer to the molded article body and the molded article body as compared with a pressure of a second space that is greater than the first space with respect to the decorative sheet.

In another preferred embodiment, the step of moving the decorative sheet closer to the molded article body is performed such that the spread suppressing member faces the second space.

In another preferred embodiment, the production method of a molded article according to the present invention includes, after the step of moving the decorative sheet closer to the molded body, the step of cooling the spread suppressing member by introducing a gas into the second space.

In another preferred embodiment, the production method of a molded article according to the present invention includes, after the step of joining the decorative sheet to the surface of the molded body, the step of removing the spread suppressing member.

In another preferred embodiment, the spread suppressing member is provided on the side of the second principal surface of the base member.

In another preferred embodiment, after the step of joining the decorative sheet to the surface of the molded article body, the decoration layer is disposed between the base member and the molded article body.

In another preferred embodiment, the molded article body includes a first member and a second member disposed on a surface of the first member, and in the step of joining the decorative sheet to the surface of the molded article body, the decorative sheet is joined to the surface of the molded article body so as to cover both of the first member and the second member, thereby joining the first member and the second member.

The production method of a molded article according to another preferred embodiment of the present invention includes the steps of preparing a decorative sheet including a base member made of a resin material and having first and second principal surfaces opposed to each other, and a decoration layer provided on the first principal surface of the base member and having a pattern area representing a predetermined pattern, preparing a molded article body, heating the decorative sheet, and joining the decorative sheet, which has been heated, to a surface of the molded article body such that a temperature of a portion of the decorative sheet corresponding to the pattern area is less than a temperature of the other portion of the decorative sheet.

In another preferred embodiment, the step of joining the decorative sheet to the surface of the molded article body includes the step of cooling the decorative sheet such that the temperature of the portion corresponding to the pattern area is rapidly reduced as compared with the temperature of the other portion.

In another preferred embodiment, the decorative sheet further includes a member provided at a location corresponding to the pattern area on the side of the first principal surface or on the side of the second principal surface of the base member and having a higher coefficient of thermal conductivity than a coefficient of thermal conductivity of the base member.

In another preferred embodiment, the member is made of a material including metal.

In another preferred embodiment, the member is made of metal.

In another preferred embodiment, a coefficient of thermal conductivity of the member is about 10 W/m·K or more.

A motor vehicle according to another preferred embodiment of the present invention includes the molded article produced by the above-described production method.

Other features, elements, steps, characteristics and advantages will become more apparent from the following detailed description of preferred embodiments of the present invention with reference to the attached drawings.

DETAILED DESCRIPTION OF PREFERRED EMBODIMENTS

Figure 1:
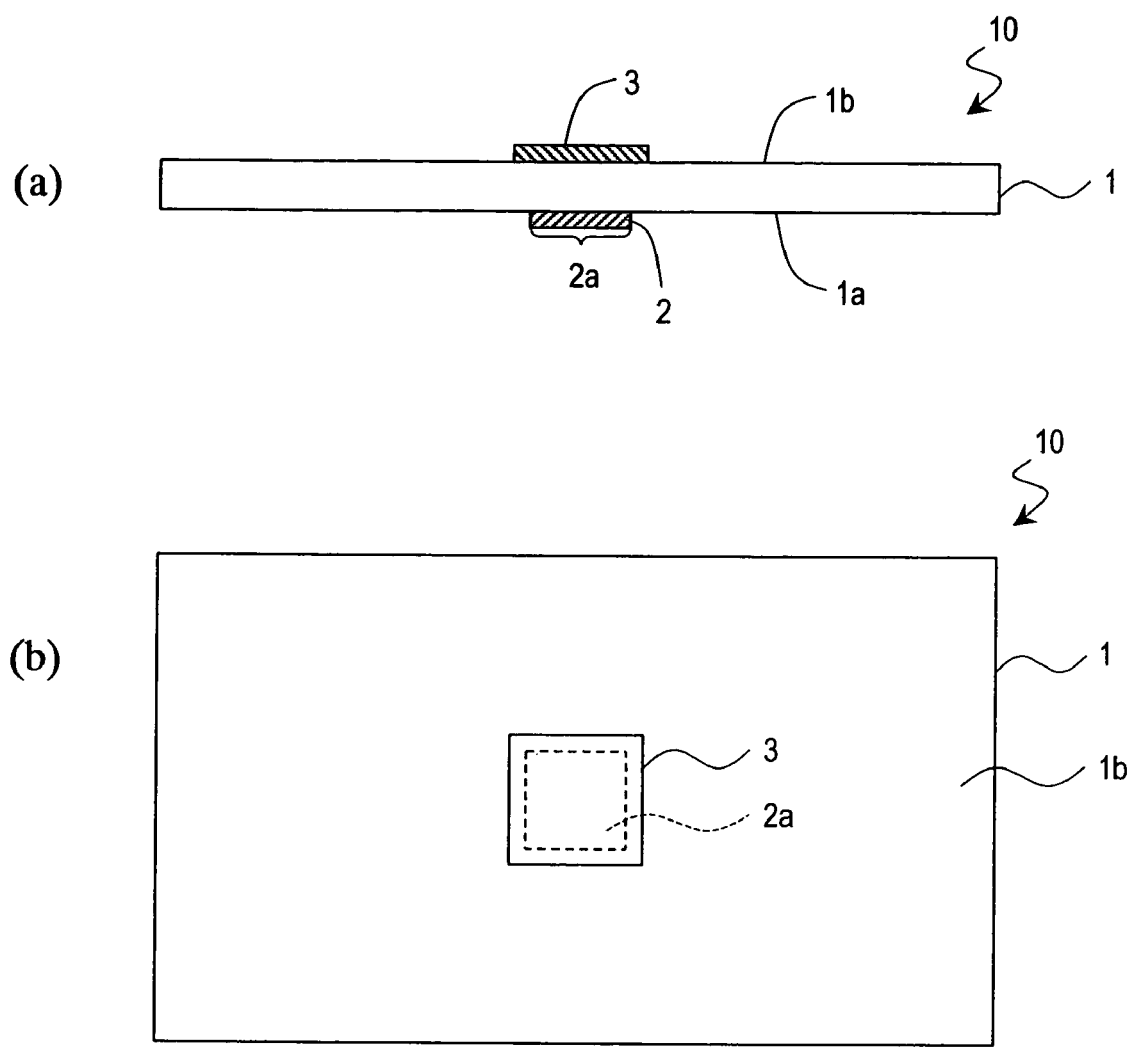
FIG. 1(a) is a sectional view schematically showing a decorative sheet according to a preferred embodiment of the present invention.
FIG. 1(b) is a top view schematically showing the decorative sheet according to a preferred embodiment of the present invention.

Hereinafter preferred embodiments of the present invention will be described with reference to the accompanying drawings. The present invention is not limited to the preferred embodiments described below.

A decorative sheet 10 in this preferred embodiment is schematically shown in FIGS. 1(a) and (b). The decorative sheet 10 includes, as shown in FIGS. 1(a) and (b), a base member 1 having a first principal surface 1a and a second principal surface 1b which are opposed to each other, and a decoration layer 2 provided on the first principal surface 1a of the base member 1.

Figure 2:
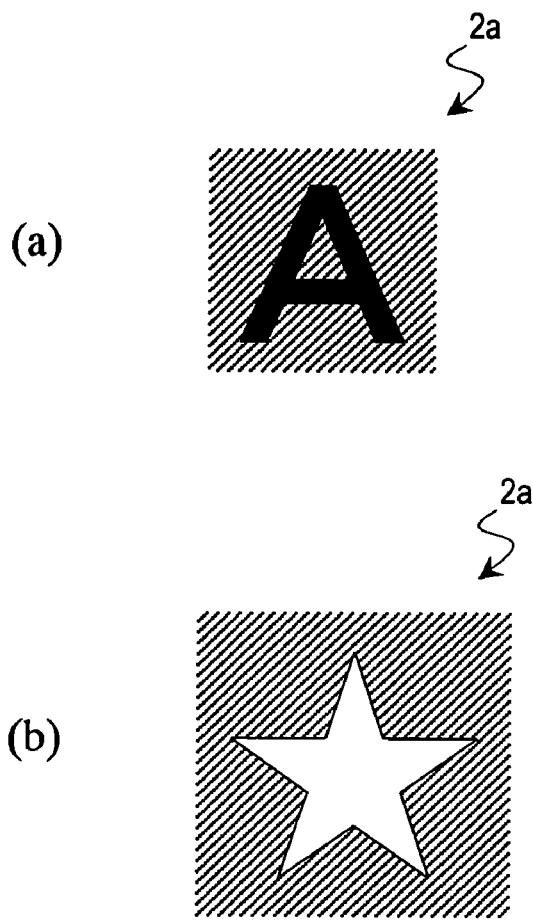
FIGS. 2(a) and (b) are views showing exemplary patterns represented by a pattern area of a decoration layer.

The base member 1 is made of a resin material, and preferably of a thermoplastic resin material. The decoration layer 2 is preferably formed from ink. The decoration layer 2 includes a pattern area 2a representing a predetermined pattern. The pattern represented by the pattern area 2a is preferably a design such as a diagram, a color-coding, or gradation, and more particularly, a character shown in FIG. 2(a), a graphic symbol shown in FIG. 2(b), or a picture.

Figure 3:
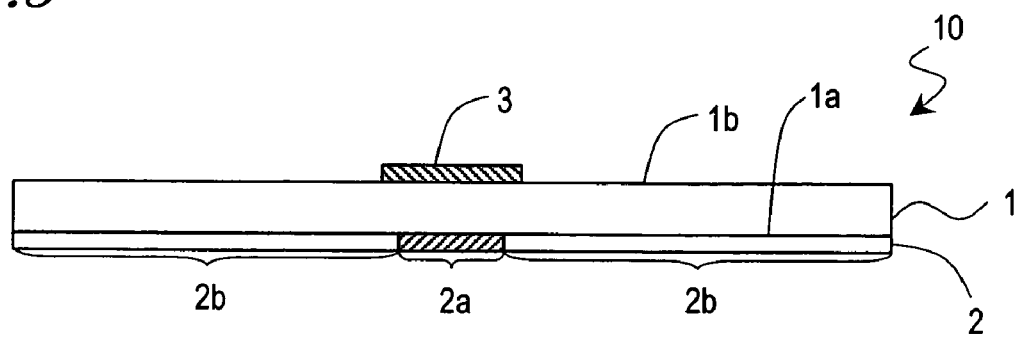
FIG. 3 is a sectional view schematically showing another preferred embodiment of a decorative sheet according to the present invention.

In FIGS. 1(a) and (b), the decoration layer 2 having the pattern area 2a along an entire surface thereof is provided on a portion of the principal surface 1a. Alternatively, as shown in FIG. 3, the decoration layer 2 having the pattern area 2a only in a portion may be provided on the entire surface of the principal surface 1a. An area 2b other than the pattern area 2a of the decoration layer 2 is, for example, a monotone area without any pattern.

Figure 4:
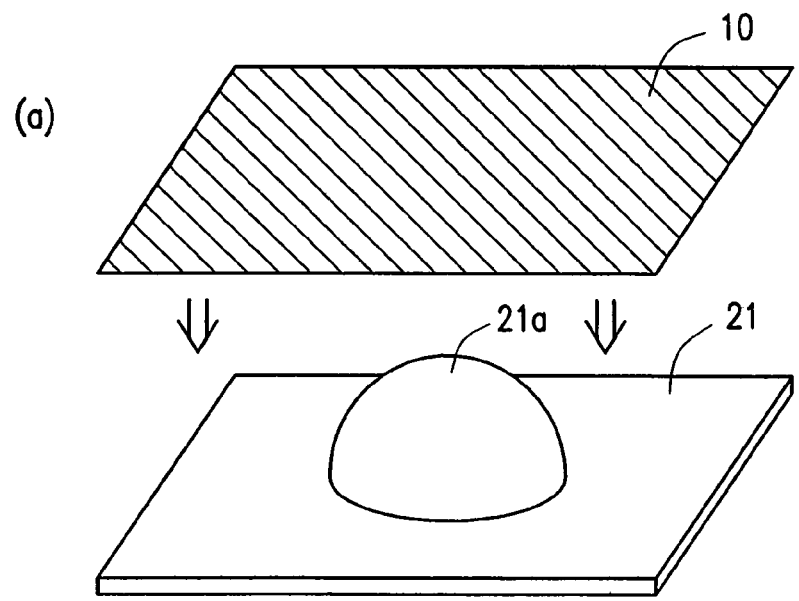
FIGS. 4(a), (b), and (c) are views schematically showing a preferred embodiment of the use of the decorative sheet according to the present invention.
Figure 4:
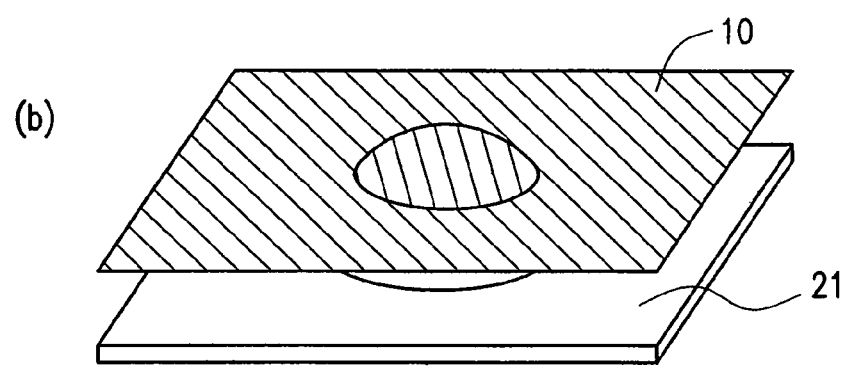
Figure 4:
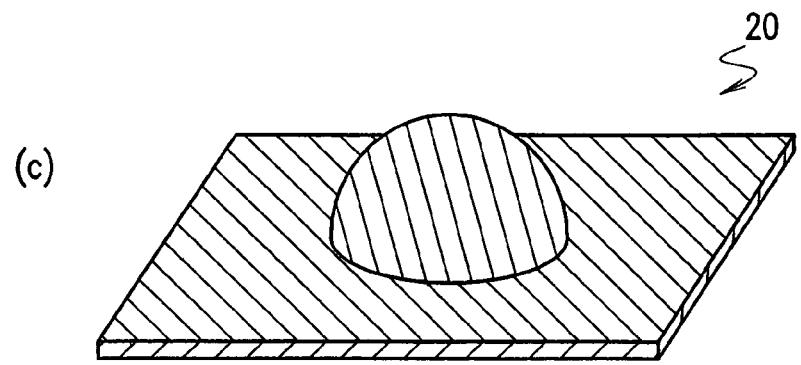

FIGS. 4(a), (b), and (c) show examples of the use of the decorative sheet 10. The decorative sheet 10 is joined to the surface of a molded article body 21, so as to decorate the molded article 20, as shown in FIGS. 4(a), (b), and (c). The decoration layer has a pattern area, such that improved decorating effects are achieved, as compared to a decoration layer having no pattern area (a monotone decoration layer without any pattern, for example). In other words, the pattern area is an area in which improved decoration accuracy is required as compared to the other area of the decoration layer after being joined to the molded article body 21.

The molded article body 21 shown in FIG. 4(a) has a protruding portion 21a of a substantially hemispherical shape (e.g., a bowl-like shape), and the surface is uneven. Therefore, when the decorative sheet 10 is to be joined, the decorative sheet 10 is spread so as to follow the unevenness. In order to successfully perform the spread of the decorative sheet 10, joining is preferably performed after the decorative sheet 10 is heated and softened.

The decorative sheet 10 is provided with a spread suppressing member 3 for suppressing the spread of the pattern area 2a, as shown in FIGS. 1(a) and (b), and FIG. 3. The spread suppressing member 3 is provided at a location corresponding to the pattern area 2a. The spread suppressing member 3 in this preferred embodiment is arranged so as to overlap the pattern area 2a on the side of the second principal surface 1b of the base member 1 (on the side opposite to the side on which the decoration layer 2 is provided).

The spread suppressing member 3 has a lower spreading property than that of the base member 1, for example, such that the spread of the pattern region 2a is suppressed.

Alternatively, the spread suppressing member 3 has a coefficient of thermal conductivity that is greater than a coefficient of thermal conductivity of the base member 1, such that the spread of the pattern area 2a is suppressed. If the coefficient of thermal conductivity of the spread suppressing member 3 is greater than the coefficient of thermal conductivity of the base member 1, a temperature of a portion of the decorative sheet 10 on which the spread suppressing member 3 is provided reduces more rapidly than the other portion after the heating. Thus, the spreading property is reduced as compared to the other portion. Therefore, the spreading of the pattern area 2a is suppressed.

The spread suppressing member 3 preferably has both of the above-described physical properties, in order to effectively suppress the spread of the pattern region 2a.

If the joining as shown in FIGS. 4(a) to (c) is performed by using a conventional decorative sheet, the pattern such as a character, a graphic symbol, or a picture is deformed, such that the appearance of the molded article is deteriorated.

On the contrary, the decorative sheet 10 according to preferred embodiments of the present invention includes the spread suppressing member 3, such that the spread of the pattern region 2a in joining to the molded article body 21 is suppressed. Therefore, when decoration of the molded article is performed using the decorative sheet 10 according to preferred embodiments of the present invention, the deformation of the pattern is prevented, and the appearance of the pattern is greatly improved. The spread suppressing member 3 is arranged so as to overlap only a portion of the principal surface 1b of the base member 1 in accordance with the pattern area 2a (that is, provided partially on the principal surface of the base member 1), such that the decorative sheet 10 closely follows the unevenness of the surface of the molded article body 21.

Hereinafter, preferable materials, structures, and layouts of the spread suppressing member 3, the decoration layer 2, and the base member 1 will be described.

As a material for the spread suppressing member 3, metal such as aluminum, copper, and stainless steel can be preferably used. As the spread suppressing member 3, a foil, a film, a thin plate, or other suitable spread suppressing member made of any one of the above-mentioned metals may be preferably used. Generally, a coefficient of thermal conductivity of metal is greater than a coefficient of thermal conductivity of a resin by two or three digits. For this reason, if metal is used as the material for the spread suppressing member 3, the coefficient of thermal conductivity of the spread suppressing member 3 is substantially greater than the coefficient of thermal conductivity of the base member 1 made of a resin material. Therefore, it is easy to rapidly reduce the temperature of the portion of the decorative sheet 10 in which the spread suppressing member 3 is provided. Thus, the spread of the pattern area 2a is effectively suppressed.

The spread suppressing member 3 is not limited to being made of metal. Since metal or a metal compound has a much higher coefficient of thermal conductivity than that of a resin, the coefficient of thermal conductivity of the spread suppressing member 3 will be sufficiently greater than the coefficient of thermal conductivity of the base member 1 by using a material including metal or a metal compound. As a material including metal or a metal compound, for example, a material in which filler (inorganic filler) including metal or a metal compound is mixed in a resin matrix may be used. As a metal compound of the filler, for example, a metal oxide such as alumina may be used.

In order to rapidly reduce the temperature of the portion of the decorative sheet 10 in which the spread suppressing member 3 is provided, and to effectively suppress the spread of the pattern region 2a, the coefficient of thermal conductivity of the spread suppressing member 3 is preferably in the range of about 50 times to about 100 times that of the coefficient of thermal conductivity of the base member 1. Specifically, the coefficient of thermal conductivity of the spread suppressing member 3 is preferably about 10 W/m·K or more, and more preferably about 15 W/m·K or more, and much more preferably about 20 W/m·K. The coefficient of thermal conductivity of a resin material is about 0.2 (the coefficient of thermal conductivity of polycarbonate is 0.19 W/m·K, and the coefficient of thermal conductivity of acryl resin is 0.2 W/m·K, for example). On the contrary, the coefficient of thermal conductivity of alumina is about 21 W/m·K, and the coefficient of thermal conductivity of aluminum is about 236 W/m·K.

Alternatively, as the material for the spread suppressing member 3, a resin material may be used. If a resin material having a higher deflection temperature under load (a heat deflection temperature) than that of a resin material of the base member 1, or a resin material having higher rigidity than that of a resin material of the base member 1, is used, the spreading property of the spread suppressing member 3 is less than that of the base member 1, such that the spread of the pattern region 2a is suppressed.

A thickness of the spread suppressing member 3 is preferably in the range of about 5 μm to about 100 μm. If the thickness is less than about 5 μm, the strength is insufficient, and deformation or breakage may occur. If the thickness exceeds about 100 μm, in the case where metal is used as the material, the following property of the spread suppressing member 3 with respect to the unevenness (convex and concave) of the molded article body 21 is insufficient. Thus, the spread suppressing member 3 may peel off during joining.

Figure 5:
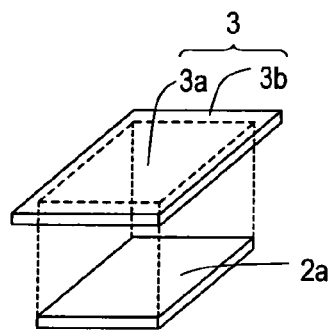
FIG. 5 is a view schematically showing a preferred structure of a spread suppressing member.

As shown in FIG. 5, the spread suppressing member 3 preferably has a portion 3a which overlaps the pattern area 2a (an overlap portion). When the spread suppressing member 3 includes such an overlap portion 3a, the effect for suppressing the spread is directly achieved for the pattern area 2a. Thus, the spreading of the pattern area 2a is effectively suppressed.

As shown in FIG. 5, when the spread suppressing member 3 also includes a portion 3b which is disposed in an outer circumference of the overlap portion 3a (an outer circumference portion), the spreading of the pattern area 2a is more surely suppressed. From the point of view that the spreading of the pattern area 2a is effectively suppressed, and the spreading of the portion other than the pattern area 2a is not prevented, the width of the outer circumference portion 3b of the spread suppressing member 3 is preferably in the range of about 1 mm to about 10 mm, and more preferably in the range of about 2 mm to about 8 mm.

Even if the spread suppressing member 3 does not include a portion overlapping the pattern area 2a, but has a frame-like shape along the edges of the pattern area 2a, the spreading of the pattern area 2a is suppressed. However, as shown in FIG. 5, when the spread suppressing member 3 includes the portion 3a overlapping the pattern area 2a, the spread suppressing member 3 suppresses the spreading of the pattern area 2a more effectively.

As a material of the decoration layer 2, ink including a resin material as a binder and pigment dispersed in the resin material can be used, as an example. The decoration layer 2 can be formed by printing with such an ink, for example. The material of the decoration layer 2 is preferably superior in heat resistance and flexibility. The ink disclosed in Japanese Laid-Open Patent Publication No. 2002-275405 has superior heat resistance and flexibility, such that the ink is preferably used as the material for the decoration layer 2.

As a resin material of the base member 1, a thermoplastic resin material can be suitably used, as described above. More specifically, polycarbonate (PC), acrylic resin, polyethylene terephthalate (PET), urethane resin, or other suitable resin material can be preferably used. However, since the base member 1 must have rigidity as a sheet base member, it is preferred that a resin material be selected in consideration of this rigidity. Although a thermosetting resin material can be used as the resin material of the base member 1, it is preferred that a thermoplastic resin material be used in view of the formability of the decorative sheet 10.

A thickness of the base member 1 is preferably within the range of about 100 μm to about 1000 μm or less. If the thickness of the base member 1 is less than about 100 μm, it is difficult to handle the base member as a sheet, or there may occur a problem where the strength is not sufficient and breakage occurs in joining. If the thickness of the base member 1 exceeds about 1000 μm, the following property with respect to the surface of the molded article body 21 may be deteriorated.

Figure 6:
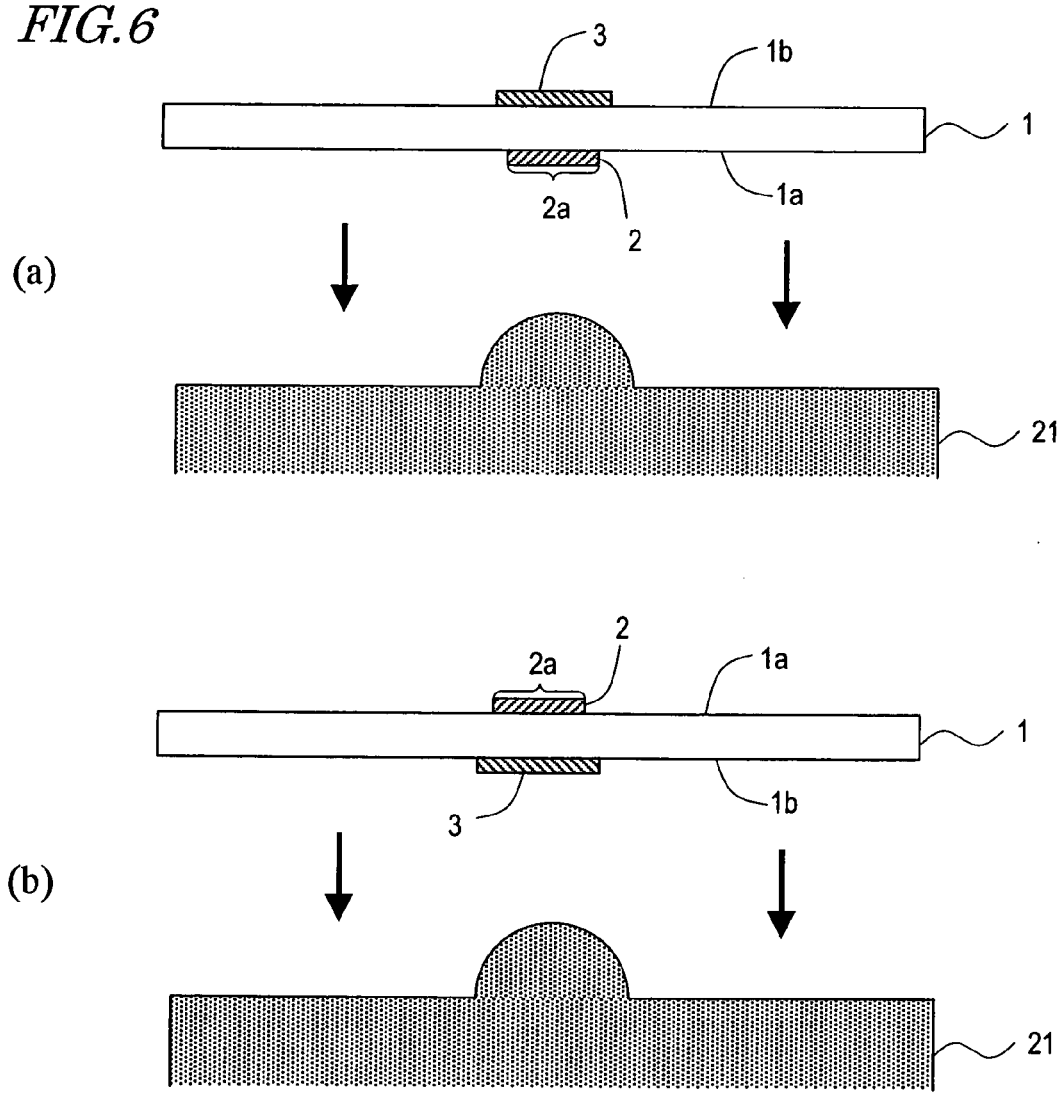
FIGS. 6(a) and (b) are views schematically showing a preferred embodiment in which the decorative sheet according to the present invention is joined to a molded article body.

The joining of the decorative sheet 10 may be performed, as shown in FIG. 6(*a*), such that the first principal surface 1a on which the decoration layer 2 is provided faces the molded article body 21, or alternatively as shown in FIG. 6(*b*), such that the second principal surface 1b on the opposite side to the first principal surface 1a faces the molded article body 21.

Figure 7:
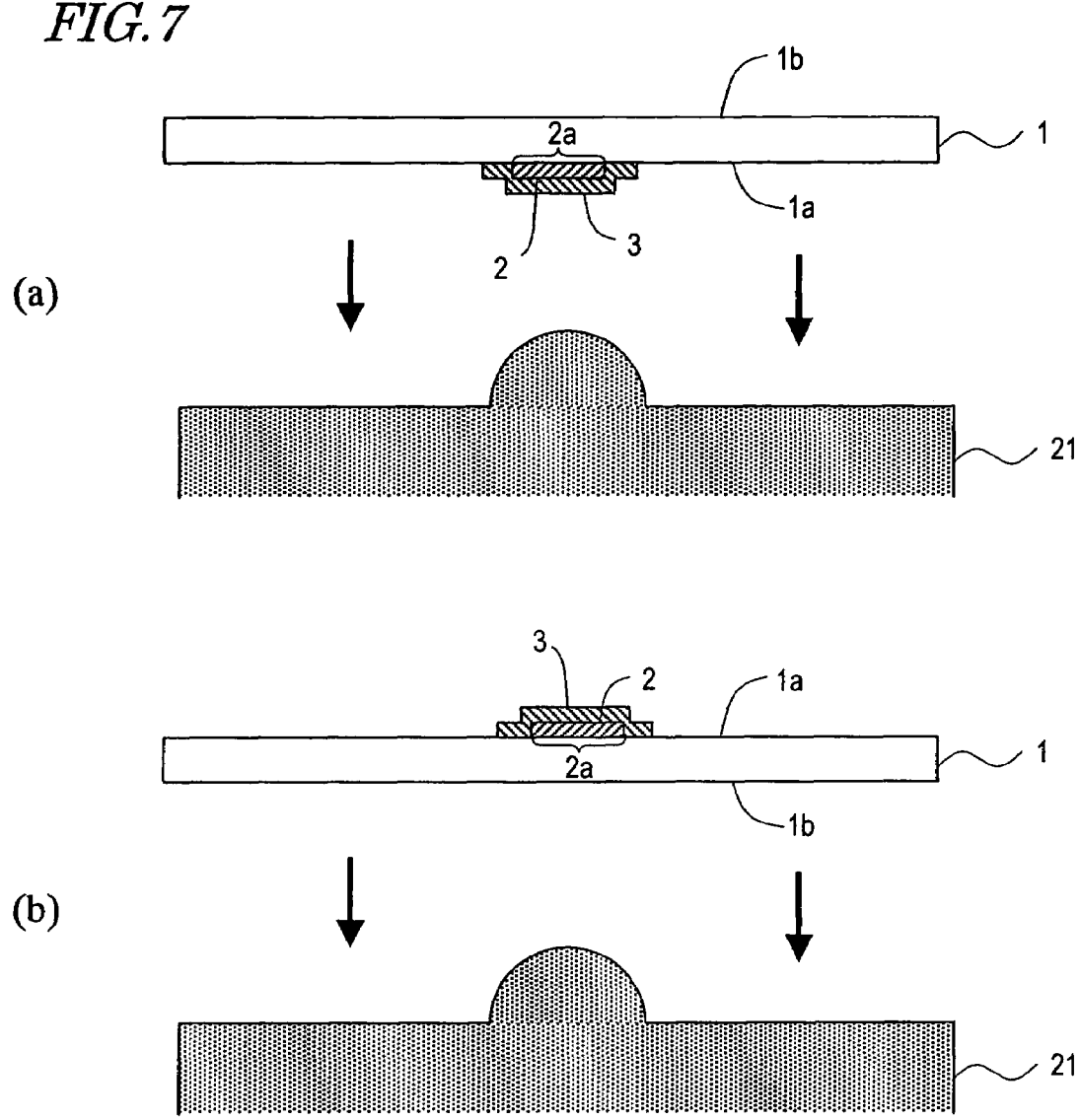
FIGS. 7(a) and (b) are views schematically showing another preferred embodiment in which the decorative sheet according to the present invention is joined to a molded article.

The spread suppressing member 3 may be provided, as shown in FIGS. 6(*a*) and (*b*), on the side of the second principal surface 1b of the base member 1 (the side on which the decoration layer 2 is not provided), or alternatively provided, as shown in FIGS. 7(*a*) and (*b*), on the side of the first principal surface 1a of the base member 1 (the side on which the decoration layer 2 is provided). In the case where the spread suppressing member 3 is provided on the side of the first principal surface 1a, after the decoration layer 2 is formed on the spread suppressing member 3 by printing or other processes, the accumulated body may be provided on the first principal surface 1a of the base member 1. Alternatively, the spread suppressing member 3 may be provided on both sides of the first principal surface 1a and the second principal surface 1b of the base member 1.

As shown in FIG. 6(*a*) and FIG. 7(*a*), when joining is performed such that the first principal surface 1a on which the decoration layer 2 is provided faces the molded article body 21, the decoration layer 2 is arranged between the base member 1 and the molded article body 21 in the completed molded article, such that the decoration layer 2 is advantageously protected by the base member 1.

On the other hand, as shown in FIG. 6(*b*) and FIG. 7(*b*), when joining is performed such that the second principal surface 1b faces the molded article body 21, the decoration layer 2 is arranged on the outer side than the base member 1. Therefore, there is an advantage that in addition to a transparent resin material or a translucent resin material, an opaque resin material can be preferably used as the resin material for the base member 1.

As shown in FIG. 6(*a*) and FIG. 7(*b*), when joining is performed such that the spread suppressing member 3 is arranged on the side opposite to the molded article body 21 with respect to the base member 1, it is possible to remove the spread suppressing member 3 after the joining. The appearance is prevented from being deteriorated because the spread suppressing member 3 remains in the completed molded article. In addition, the spread suppressing member 3 is not a portion of the decoration in the completed molded article, such that the material for the spread suppressing member 3 can be more freely selected (it is unnecessary to use a transparent or translucent material, for example). Thus, various materials such as metal can be used.

Especially when the spread suppressing member 3 is provided on the side of the second principal surface 1b of the base member 1 (on the side opposite to the side on which the decoration layer 2 is provided), and the joining is performed such that the first principal surface 1a on which the decoration layer 2 is provided faces the molded article body 21, as shown in FIG. 6(*a*), both of the advantages that the decoration layer 2 is protected by the base member 1 and that it is possible to remove the spread suppressing member 3 are achieved.

For the fixing of the spread suppressing member 3 and the decorative sheet 10, an adhesive is preferably used, for example. As an adhesive, a thermoplastic resin (thermoplastic polyurethane resin or thermoplastic acrylic resin) may be used, or a thermosetting resin (an epoxy resin, for example) may be used. When the decorative sheet 10 is heated before joining, the adhesive preferably has high heat resistance. Where the spread suppressing member 3 is removed after the joining, the adhesive used for joining the spread suppressing member 3 is preferably easy to peel off. As an adhesive which has high heat resistance and which can be easily peeled off, an adhesive of silicone type is preferable.

Next, a production method of a molded article using the decorative sheet 10 and a production apparatus used in the production method will be described.

Figure 8:
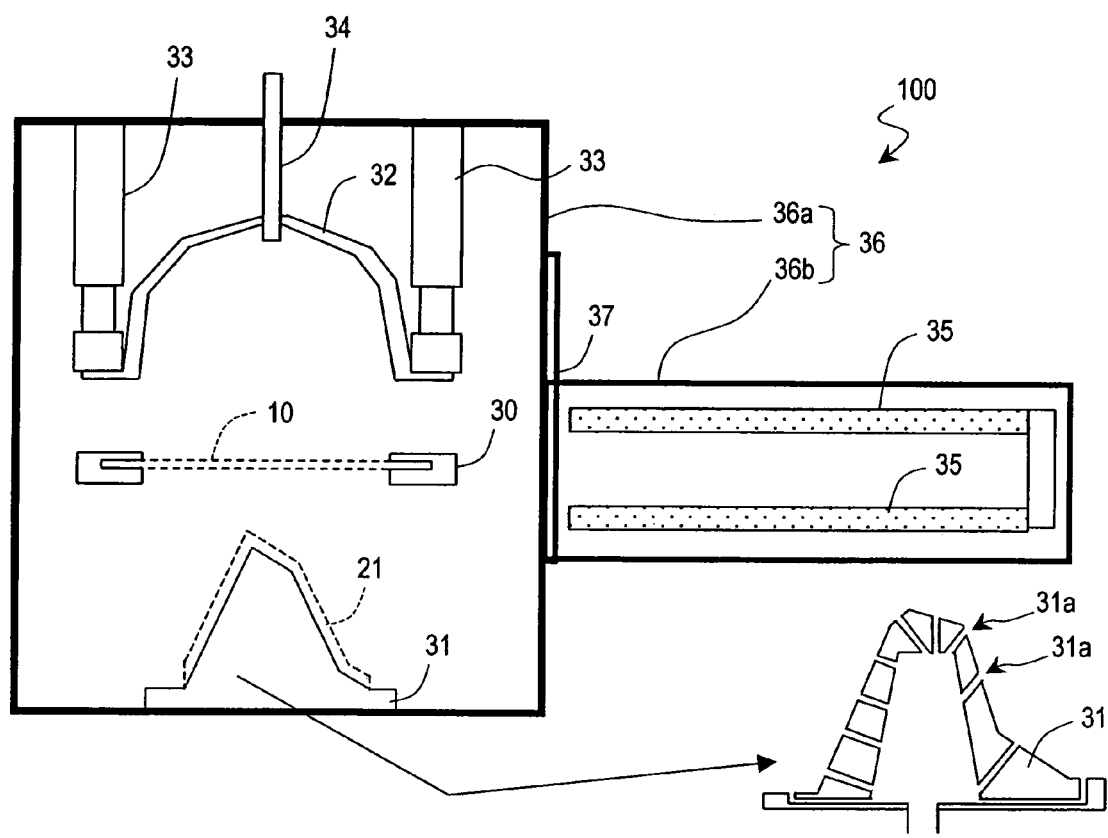
FIG. 8 is a sectional view schematically showing a producing apparatus used for producing a molded article with the decorative sheet according to a preferred embodiment of the present invention.

First, a production apparatus 100 for the molded article is described with reference to FIG. 8. The production apparatus 100 includes, as shown in FIG. 8, a holding device (a holding frame) 30 for holding the decorative sheet 10, a supporting device (a supporting table) 31 for supporting the molded article body 21, a pressurizing box 32 arranged above the holding device 30 and the supporting device 31, a sealing cylinder 33 for moving the pressurizing box 32 up and down, a pressurizing rubber hose 34 for introducing a gas into a space below the pressurizing box 32, a heater (a far infrared heater, for example) 35 for heating the decorative sheet 10, and a vacuum vessel 36 for accommodating the components of the production apparatus 100.

The vacuum vessel 36 includes a first vessel 36a for accommodating the holding device 30, the supporting device 31, the box 32, the cylinder 33, and the rubber hose 34, and a second vessel 36b for accommodating the heater 35. The heater 35 may be introduced into the first vessel 36a via a door 37, if required.

The supporting device 31 has a plurality of openings 31a. With a vacuum pump which is externally provided, the atmospheric air is sucked through the openings 31a, thereby realizing a reduced pressure (evacuation) of the space spreading over the supporting device 31. The rubber hose 34 is connected to the outside. By introducing a gas through the rubber hose 34, the space spreading below the box 32 can be pressurized.

Figure 13:
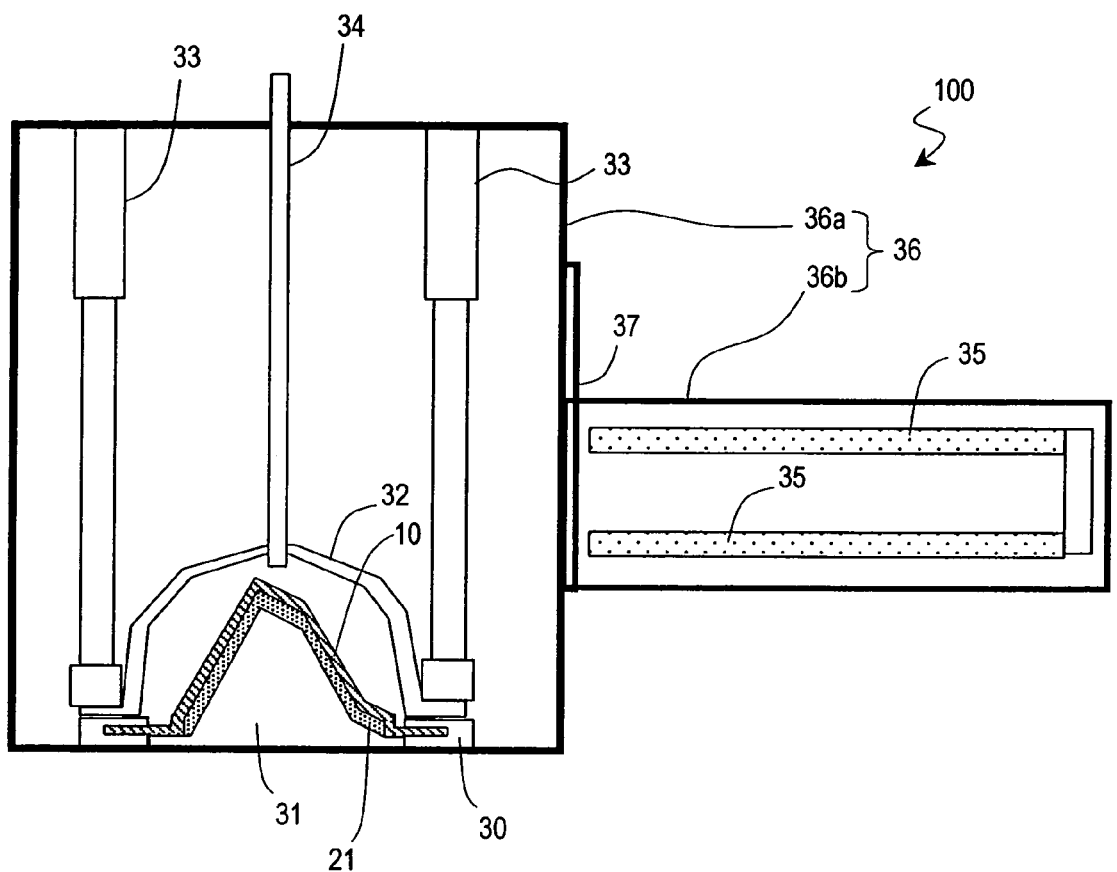
FIG. 13 is a process sectional view schematically showing a production method of a molded article with the decorative sheet according to a preferred embodiment of the present invention.
Figure 14:
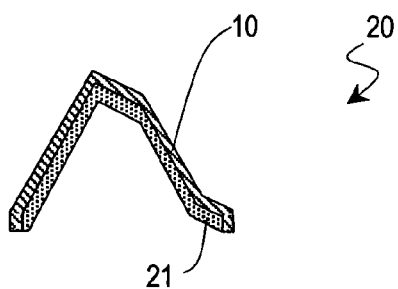
FIG. 14 is a process sectional view schematically showing a production method of a molded article with the decorative sheet according to a preferred embodiment of the present invention.
Figure 15:
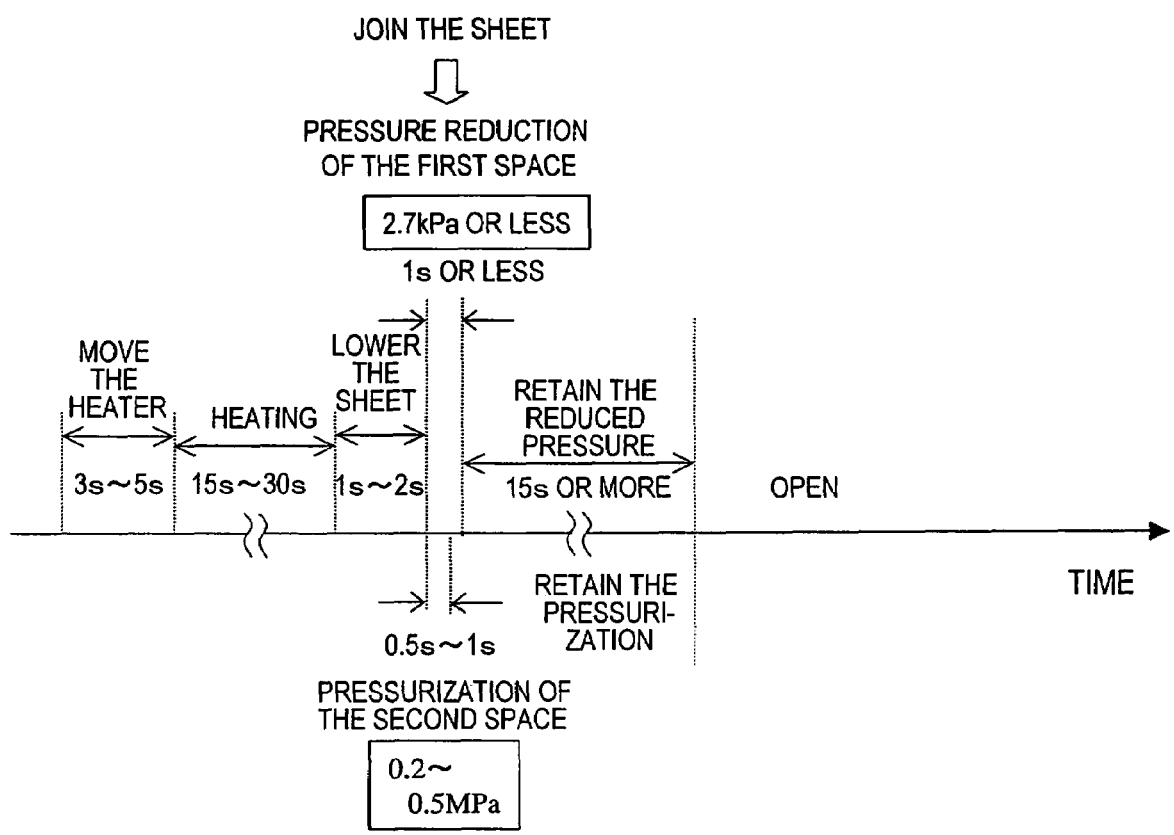
FIG. 15 is a time chart showing an exemplary time required for a production process.

Next, with reference to FIGS. 9 to 15, a production method of a molded article utilizing the decorative sheet 10 will be described. FIGS. 9 to 14 are process sectional views schematically showing the production method of the molded article. FIG. 15 is a time chart showing an example of periods of time required for respective steps.

First, the decorative sheet 10 such as shown in FIG. 1 is prepared. The decorative sheet 10 can be prepared from the above-described materials by known techniques. For example, the decorative sheet 10 can be prepared in such a manner that a decoration layer 2 is formed by printing with ink on a first principal surface 1a of a base member 1, and a spread suppressing member 3 is fixed with an adhesive on the side of a second principal surface 1b of the base member 1.

In a separate step from the step of preparing the decorative sheet 10, a molded article body 21 is prepared. The molded article body 21 may be formed from a resin material, or may be formed from a metal material. Alternatively, the molded article body 21 may be formed from other materials, such as wood, for example. The molded article body 21 may be transparent, opaque, or translucent. The molded article body 21 is preferably prepared by a known technique. Where a resin material is used, the molded article body 21 may be prepared by injection molding, for example. As the resin material, both of a thermoplastic resin and a thermosetting resin can be used. Specifically, an unsaturated polyester resin, an epoxy resin, a vinyl ester resin, a polyurethane resin, and other suitable resins may be used.

Figure 9:
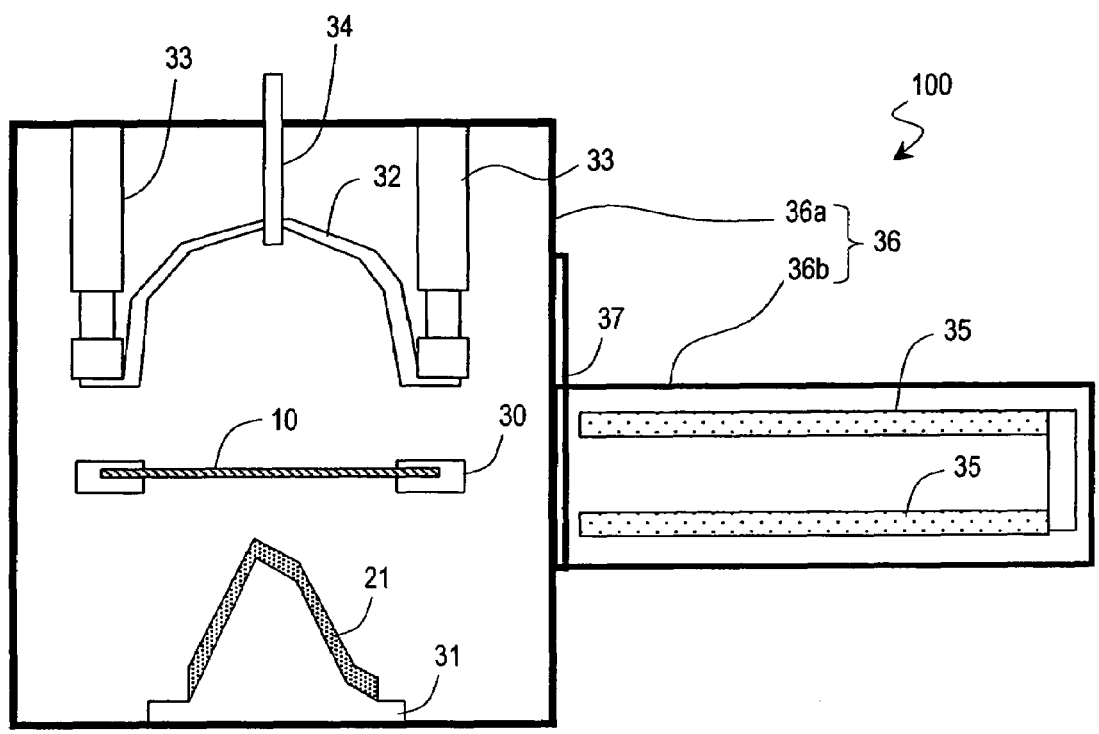
FIG. 9 is a process sectional view schematically showing a production method of a molded article with the decorative sheet according to a preferred embodiment of the present invention.

Next, as shown in FIG. 9, the molded article body 21 is placed on the supporting device 31, and the decorative sheet 10 is fixed to the holding device 30 such that the decorative sheet 10 is arranged above the molded article body 21. At this time, an adhesive is applied to a surface of the decorative sheet 10 on the side of the molded article body 21. In this preferred embodiment, thereafter, the air in the vacuum vessel 36 is sucked through the openings 31a of the supporting device 31 by a vacuum pump which is externally provided. Thus, the pressure in the inside of the vacuum vessel 36 is reduced. As the result of the pressure reduction, the internal pressure of the vacuum vessel 36 is preferably about 2.7 kPa or less, for example.

Figure 10:
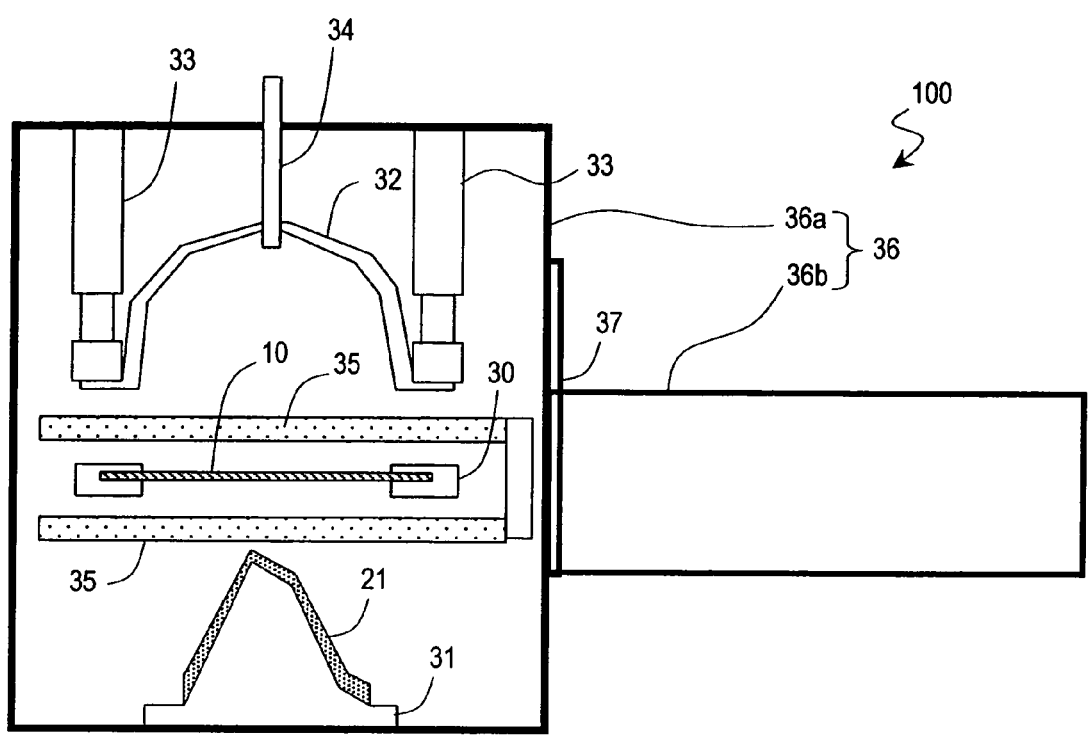
FIG. 10 is a process sectional view schematically showing a production method of a molded article with the decorative sheet according to a preferred embodiment of the present invention.

Next, as shown in FIG. 10, the decorative sheet 10 is heated by the heater 35, thereby softening the decorative sheet 10. At this time, the decorative sheet 10 is typically heated to temperatures equal to or greater than a deflection temperature under load of the resin material which forms the base member 1. If the heating temperature is too low, it is difficult to deform the resin material. Therefore, the resin material may be broken when being shaped (or attached), or the shaping itself cannot be performed. If the heating temperature is too high, the sheet tends to sag when heated, such that it is difficult to perform the shaping, or the appearance may be degraded because of air bubbles in the resin material. Therefore, it is preferred that the heating temperature be appropriately set in accordance with the type of resin material used for the base member 1. When polycarbonate is used as the resin material for the base member 1, the decorative sheet 10 is heated up to about 195° C., for example. The movement of the heater 35 from the second vessel 36b to the first vessel 36a is performed in about 3 to about 5 seconds, for example. The heating by the heater 35 is performed for about 15 to about 30 seconds, for example.

Figure 11:
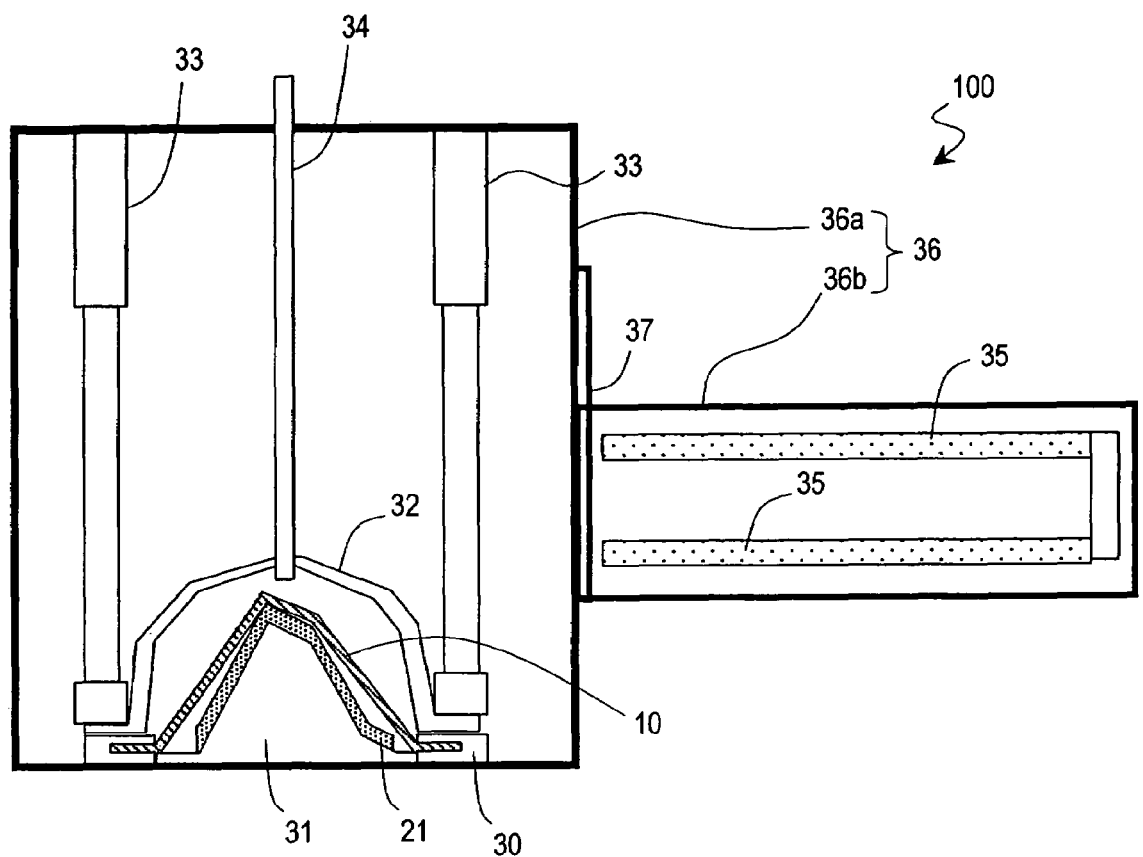
FIG. 11 is a process sectional view schematically showing a production method of a molded article with the decorative sheet according to a preferred embodiment of the present invention.

Thereafter, as shown in FIG. 11, the pressurizing box 32 and the holding device 30 are moved downwardly by the cylinders 33, such that the decorative sheet 10 is moved closer to the molded article body 21. The downward movement is performed in about 1 to about 2 seconds, for example. In this preferred embodiment, the decorative sheet 10 is moved downwardly. Alternatively, the supporting device 31 for supporting the molded article body 21 may be moved upwardly, such that the molded article body 21 is moved closer to the decorative sheet 10.

Figure 12:
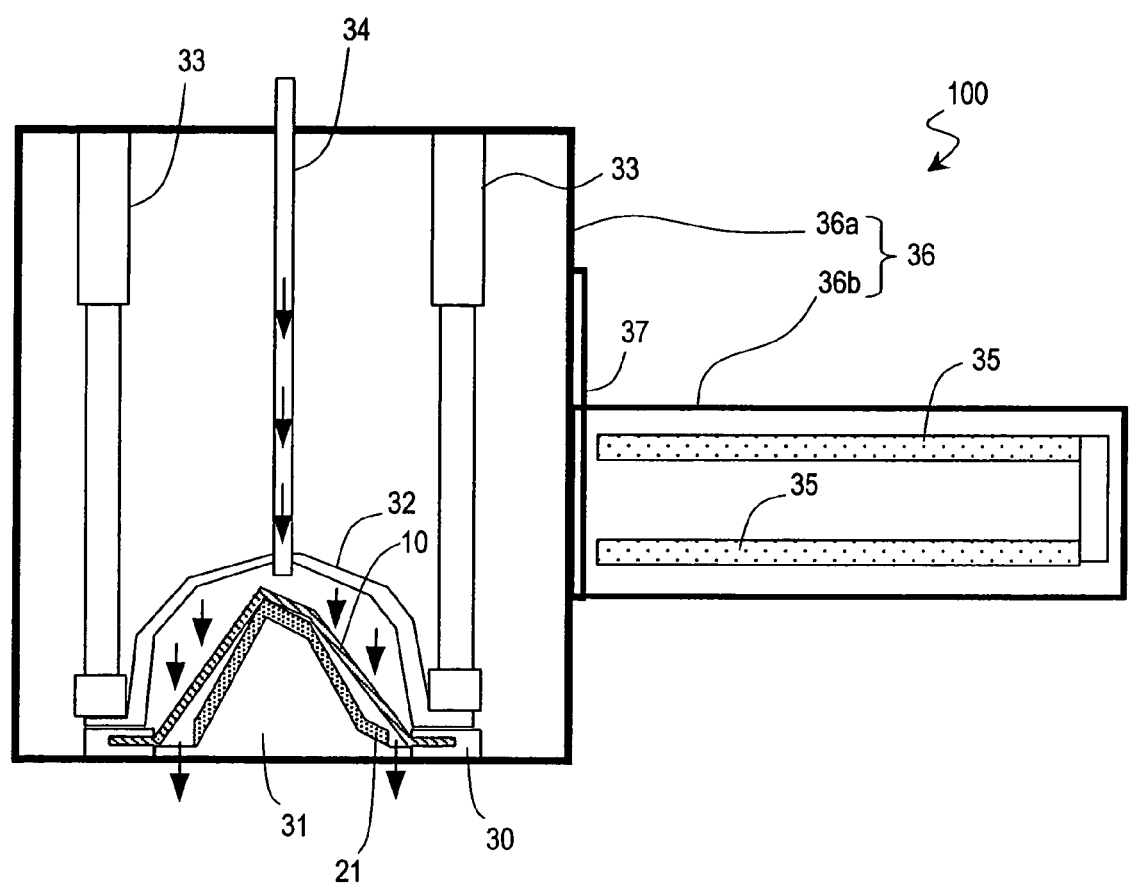
FIG. 12 is a process sectional view schematically showing a production method of a molded article with the decorative sheet according to a preferred embodiment of the present invention.

Next, as shown in FIG. 12, a pressure of a first space formed between the decorative sheet 10 and the molded article body 21 is reduced more than a pressure of a second space expanded on the opposite side to the first space with respect to the decorative sheet 10 (that is, a space formed between the decorative sheet 10 and the pressurizing box 32). As a result, the decorative sheet 10 is joined to the molded article body 21, as shown in FIG. 13.

Specifically, together with the reduction of pressure in the first space by the vacuum pump, a gas is introduced into the box 32 through the rubber hose 34, so as to pressurize the second space. As a result, the decorative sheet 10 is pressed against the molded article body 21 with a substantially uniform pressure, thereby joining the decorative sheet 10 to the molded article body 21. The pressure is reduced in the first space such that the internal pressure of the first space is about 2.7 kPa or less, for example. The pressurizing of the second space is performed such that the internal pressure of the second space is about 0.2 MPa to about 0.5 MPa. The reduced pressure condition of the first space and the pressurized condition of the second space are maintained for a predetermined period of time (for at least about 15 seconds, for example). A temperature of the gas (the air, for example) introduced into the second space is about room temperature (about 15° C. to about 30° C.), for example.

Next, the vacuum vessel 36 is opened, such that the internal pressure of the vacuum vessel 36 is returned to be the atmospheric pressure. Unnecessary portions of the decorative sheet 10 are cut (trimmed) with a cutting device, such as a rotary blade. Thereafter, the molded article body 21 is released from the supporting device 30, thereby completing a molded article 20, as shown in FIG. 14.

According to the above-described production method, the joining of the decorative sheet 10 to the molded article body 21 is performed in a very short period of time (in about 1 second or less, as an example). In addition, during joining, the decorative sheet 10 is completely spread, but the spreading of the pattern portion 2a of the decoration layer 2 is suppressed by the spread suppressing member 3. Therefore; the distortion of the pattern is prevented, and the appearance is not deteriorated.

When the spreading property of the spread suppressing member 3 is less than the spreading property of the base member 1, the spreading of the pattern portion 2a is suppressed. When the coefficient of thermal conductivity of the spread suppressing member 3 is greater than the coefficient of thermal conductivity of the base member 1, the temperature of the portion of the decorative sheet 10 in which the spread suppressing member 3 is provided (that is, the portion corresponding to the pattern area 2a) more rapidly decreases than the temperature of the other portions of the decorative sheet 10. Therefore, the joining of the decorative sheet 10 is performed in a condition in which the temperature of the portion of the decorative sheet 10 corresponding to the pattern area 2a is less than the temperature of the other portions of the decorative sheet 10. Therefore, the spreading of the pattern portion 2a is further suppressed.

When the heating by the heater 35 is stopped, the decorative sheet 10 is allowed to naturally cool. As a result, the above-described non-uniform temperature distribution of the decorative sheet 10 is achieved. Alternatively, positive cooling may be performed. When the gas is introduced into the second space during joining, as in this preferred embodiment, the introduced gas can not only pressurize the second space, but also cool the surface of the decorative sheet 10 on the side of the second space. Therefore, when the spread suppressing member 3 faces the second space, the spread suppressing member 3 is cooled by the gas, such that the above-described non-uniform temperature distribution is rapidly achieved. Therefore, even where the joining is performed in a very short time as described above, the spreading of the pattern area 2a is more effectively suppressed.

Where the joining is performed such that the spread suppressing member 3 faces the second space, the spread suppressing member 3 may be removed from the molded article 20, if necessary. If the fixing of the spread suppressing member 3 is performed using an adhesive that can be easily peeled off, the removal can be easily performed.

Figure 16:
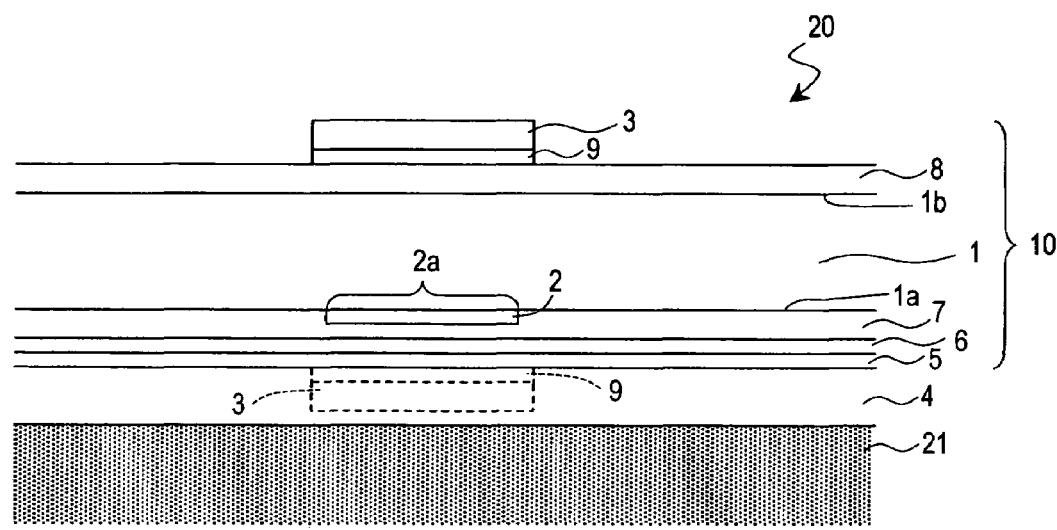
FIG. 16 is a sectional view schematically showing a molded article.

The spread suppressing member 3 is not required to be in direct contact with the first principal surface 1a or the second principal surface 1b of the base member 1. An adhesive layer is typically provided between the base member 1 and the spread suppressing member 3, and additionally, another layer may be interposed. FIG. 16 is a partially enlarged view of an example of the sectional structure after the joining.

In the structure shown in FIG. 16, on the second principal surface 1b of the base member 1 of polycarbonate, a protecting layer 8 preferably made of an acrylic resin is provided. On the protecting layer 8, the spread suppressing member 3 preferably made of aluminum is provided with the adhesive layer 9 interposed therebetween. The protecting layer 8 is arranged on the outer side of the base member 1 in the molded article 20, such that the protecting layer 8 protects the base member 1 and improves the weather resistance of the decorative sheet 10. The base member 1 has a thickness of about 200 μm to about 1000 μm, for example. The protecting layer 8 has a thickness of about 5 μm to about 50 μm, for example. The spread suppressing member 3 has a thickness of about 5 μm to about 100 μm, for example. The adhesive layer 9 has a thickness of about 5 μm to about 50 μm, for example.

As shown in FIG. 16, on the first principal surface 1a of the base member 1, the decoration layer 2 preferably made of ink is provided. On the decoration layer 2, a metal layer 6 preferably made of tin is provided with the adhesive layer 7 interposed therebetween. Since the metal layer 6 has metallic luster, the decorative sheet 10 has metallic tones (metallic color) having a metallic appearance. Herein, the metal layer 6 is formed such that tin is evaporated on a carrier film 5, and the layered body is attached to the first principal surface 1a with an adhesive. The decoration layer 2 has a thickness of about 5 µm to about 50 µm, for example. The metal layer 6 has a thickness of about 0.25 µm to about 0.8 µm, for example, and is preferably made of soft metal such as tin.

The decorative sheet 10 shown in FIG. 16 is joined to the molded article body 21 by the adhesive layer 4. The adhesive layer 4 has a thickness of about 5 µm to about 50 µm for example. As described above, the spread suppressing member 3 may be provided on the side of the first principal surface 1a of the base member 1. More specifically, as shown by a dotted line in FIG. 16, on the first principal surface 1a of the base member 1, the spread suppressing member 3 may be provided with the decoration layer 2, the adhesive layer 7, the metal layer 6, and the carrier film 5 interposed therebetween.

Figure 17:
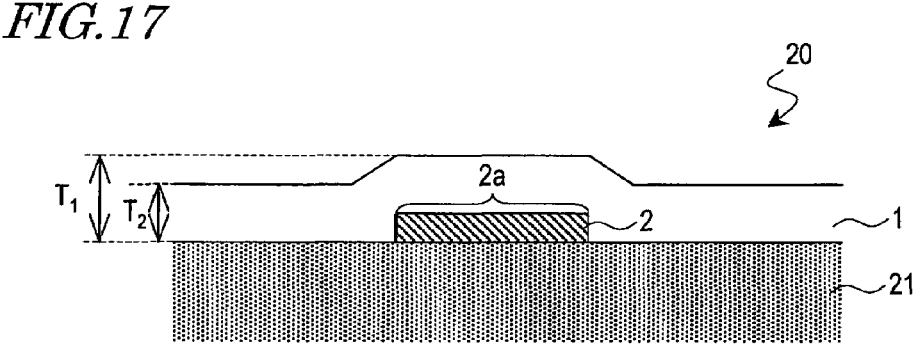
FIG. 17 is a sectional view schematically showing a molded article.

In order to maintain the decorating effect of the pattern area 2a of the decoration layer 2, as shown in FIG. 17, the thickness $T_1$ of the portion of the sheet 10 corresponding to the pattern area 2a is preferably in the range of about 1.1 times to about 1.8 times greater than the thickness $T_2$ of the other portion of the sheet 10. More preferably, the thickness $T_1$ is in the range of about 1.2 times to about 1.6 times greater than the thickness $T_2$. When the pattern area 2a has a thickness $T_1$ less than about 1.1 times the thickness $T_2$, stepped cuts may occur in the pattern area 2a due to the unevenness of the surface of the molded article body 21, and desired decorating effects are not achieved. When the thickness $T_1$ is greater than about 1.8 times the thickness $T_2$, the appearance of the pattern area 2a may be distorted due to the lens effect, or the portion corresponding to the pattern area 2a (the portion is raised as compared with the other portion) may get scratched by friction.

In this preferred embodiment, the molded article body 21 which is integrally formed (in other words, which has a single member) is shown. Alternatively, a molded article may have a plurality of members which are separately molded, and the plurality of members may be mutually coupled by the decorative sheet 10.

Figure 18:
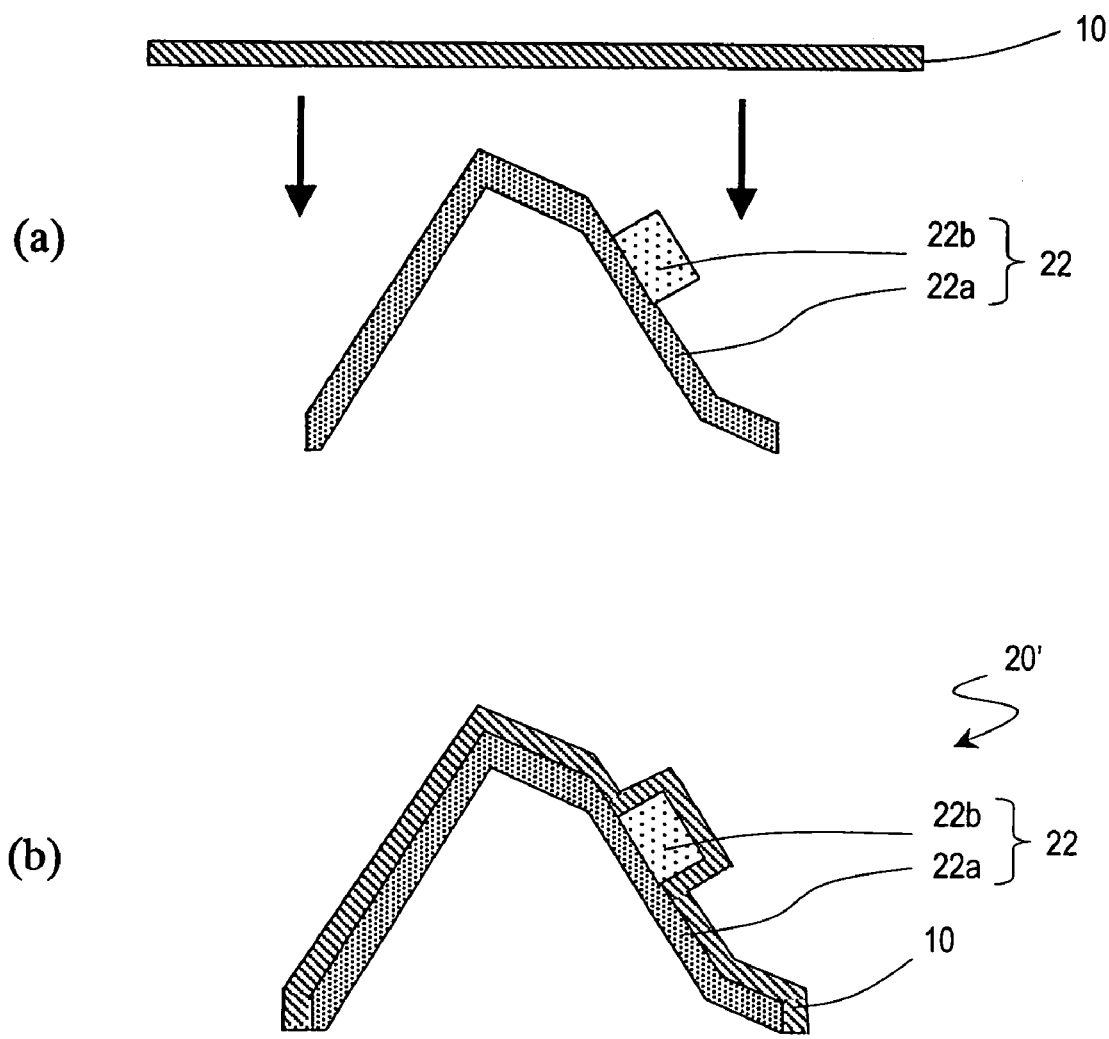
FIGS. 18(a) and (b) are sectional views schematically showing a condition where a decorative sheet is joined to a molded article body having a plurality of members which are separately molded.

Specifically, as shown in FIG. 18(a), on a surface of a molded article body 22 having a first member 22a and a second member 22b disposed on a surface of the first member 22a, the decorative sheet 10 is joined so as to cover both of the first member 22a and the second member 22b. As a result, as shown in FIG. 18(b), a molded article 20' in which the first member 22a and the second member 22b are coupled is obtained.

A relative positional relationship between the first member 22a and the second member 22b can be arbitrarily selected. For this reason, when the plurality of members 22a and 22b of the molded article body 22 are coupled by the decorative sheet 10, as described above, a large variety of shapes of molded articles can be obtained by using a relatively small number of molding dies. Therefore, the production of a large variety of shapes of molded articles is easily performed at a low cost. For the first member 22a and the second member 22b, a structure for temporarily tacking them, that is, a positioning structure for determining the relative positional relationship may be provided. The positioning structure may be a protruding portion and a concave portion which are mutually engaged, for example.

Figure 19:
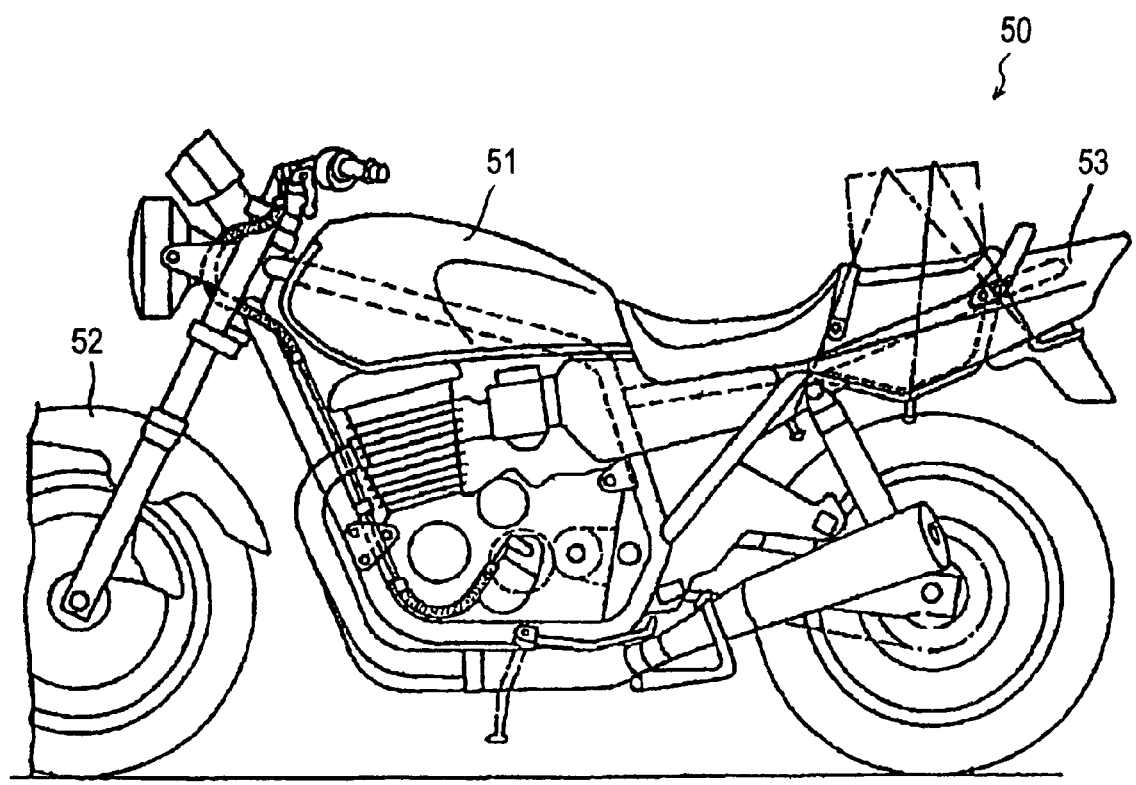
FIG. 19 is a view schematically showing a two-wheeled vehicle.

The molded article produced by the production method using the decorative sheet 10 is suitably used for the interior or exterior of motor vehicles, exterior of home electric appliances, and many other suitable molded articles. For example, the molded article is suitably used as a tank cover 51, a front fender 52, and a tail cowl 53 of a motorbike 50 shown in FIG. 19. As is well known, a "motor vehicle" includes any locomotive conveyance or machine for transporting passengers or merchandise, or for moving things, and includes a car, a motorcycle, a bus, a truck, a tractor, an airplane, a motorboat, a civil engineering vehicle, and many other motor vehicles. The motor vehicles include not only those provided with an internal combustion engine, such as a gasoline engine, but also those provided with an electric motor.

According to preferred embodiments of the decorative sheet of the present invention, since the spread suppressing member for suppressing the spreading of the pattern area is provided in a location corresponding to the pattern area of the decoration layer, the spreading of the pattern area when joined to the molded article body is suppressed. Accordingly, the decorative sheet according to preferred embodiments of the present invention is preferably used for the decorating molded articles which have an uneven surface. When the production of the molded article is performed using the decorative sheet according to preferred embodiments of the present invention, distortion of the pattern is prevented, and the appearance of the obtained molded article is greatly improved.

The molded article which is produced using the decorative sheet according to preferred embodiments of the present invention is preferably used for various goods, and especially preferably used for the interior and exterior of a motor vehicle.

The present invention is not limited to the above-described preferred embodiments, but can be modified in the scope of the attached claims. Further, the technologies disclosed in the above-described preferred embodiments can be used in combination, as desired.

The invention claimed is:

1. A decorative sheet comprising:
a deformable base member having first and second principal surfaces opposed to each other;
a continuous decoration layer provided directly on the first principal surface of the base member and having a pattern area representing a predetermined pattern, the decoration layer being defined by an ink layer that is visible from a direction perpendicular to a plane including the ink layer; and
a spread suppressing member provided at a location corresponding to the pattern area on the side of the second principal surface of the base member, for suppressing the spreading of the pattern area of the decoration layer; wherein
the spread suppressing member is arranged so as to cover only a portion of the base member and is made of a material that suppresses the spreading of the pattern area of the decoration layer.

2. The decorative sheet of claim 1, wherein the base member is made of a resin material.

3. The decorative sheet of claim 2, wherein the resin material is a thermoplastic resin material that spreads to follow an uneven surface of an article to which the base member is to be attached, and the base member is less deformable where the spread suppressing member is provided on the base member.

4. The decorative sheet of claim 1, wherein the spread suppressing member has a higher coefficient of thermal conductivity than a coefficient of thermal conductivity of the base member.

5. The decorative sheet of claim 1, wherein the spread suppressing member is made of a material including one of a metal and a metal compound.

6. The decorative sheet of claim 1, wherein the spread suppressing member is made of metal.

7. The decorative sheet of claim 1, wherein the base member is made of a resin material, and the spread suppressing member is made of a material including one of a metal and a metal compound.

8. The decorative sheet of claim 1, wherein the base member is made of a resin material, and the spread suppressing member is made of metal.

9. The decorative sheet of claim 1, wherein a coefficient of thermal conductivity of the spread suppressing member is at least about 10 W/m·K.

10. The decorative sheet of claim 1, wherein a thickness of the spread suppressing member is in a range of about 5 μm to about 100 μm.

11. The decorative sheet of claim 1, wherein the spread suppressing member includes a first portion that overlaps the pattern area.

12. The decorative sheet of claim 11, wherein the spread suppressing member includes a second portion arranged along an outer circumference of the first portion and does not cover the pattern area.

13. The decorative sheet of claim 12, wherein a width of the second portion of the spread suppressing member is in a range of about 1 mm to about 10 mm.

14. The decorative sheet of claim 12, wherein a width of the second portion of the spread suppressing member is in a range of about 2 mm to about 8 mm.

15. A molded article comprising a molded article body and the decorative sheet of claim 1 which is joined to a surface of the molded article body.

16. A molded article comprising:
a molded article body; and
a sheet joined to a surface of the molded article body; wherein
the sheet includes a deformable base member and a continuous decoration layer provided directly on a surface of the base member on the side of the molded article body;
the decoration layer includes a pattern area representing a predetermined pattern and is defined by an ink layer that is visible from a direction perpendicular to a plane including the ink layer;
a portion of the sheet corresponding to the pattern area has a thickness which is in a range of about 1.1 times to about 1.8 times a thickness of remaining portions of the sheet; and
a spread suppressing member provided at a location corresponding to the pattern area on the side of the second principal surface of the base member, for suppressing the spreading of the pattern area of the decoration layer; wherein
the spread suppressing member is arranged so as to cover only a portion of the base member and is made of a material that suppresses the spreading of the pattern area of the decoration layer.

17. The molded article of claim 16, wherein the portion of the sheet corresponding to the pattern area has a thickness which is in a range of about 1.2 times to about 1.6 times the thickness of the remaining portions of the sheet.

18. A motor vehicle comprising the molded article of claim 15.

19. The decorative sheet of claim 1, wherein the base member is transparent or translucent.

20. The decorative sheet of claim 16, wherein the base member is transparent or translucent.

21. The decorative sheet of claim 16, wherein the base member is a thermoplastic resin material that spreads to follow an uneven surface of the molded article body to which the base member is attached, and the base member is less deformable where the spread suppressing member is provided on the base member.

22. The decorative sheet of claim 16, wherein the spread suppressing member includes a first portion that covers the pattern area, a second portion arranged along an outer circumference of the first portion and does not cover the pattern area, and a width of the second portion of the spread suppressing member is in a range of about 1 mm to about 10 mm.

* * * * *